United States Patent [19]

Kelly

[11] 4,173,534

[45] * Nov. 6, 1979

[54] SLUDGE THICKENING APPARATUS AND PROCESS

[75] Inventor: Earl M. Kelly, Hillsborough, Calif.

[73] Assignee: Envirotech Corporation, Menlo Park, Calif.

[ * ] Notice: The portion of the term of this patent subsequent to Apr. 4, 1995, has been disclaimed.

[21] Appl. No.: 859,768

[22] Filed: Dec. 12, 1977

Related U.S. Application Data

[63] Continuation-in-part of Ser. No. 728,480, Sep. 30, 1976, Pat. No. 4,082,671.

[51] Int. Cl.² .............................................. C02B 3/00
[52] U.S. Cl. ............................. 210/195.3; 210/221 P; 210/197; 210/202; 210/537
[58] Field of Search .................. 210/9, 10, 13, 14, 15, 210/44, 195 S, 197, 202, 208, 221 P, 519, 520, 530, 531, 456, 537, 525

[56] References Cited

U.S. PATENT DOCUMENTS

| | | | |
|---|---|---|---|
| 2,679,477 | 5/1954 | Kivari et al. | 210/221 P |
| 2,772,234 | 11/1956 | Kelly | 210/44 |
| 3,140,259 | 7/1964 | Kelly | 210/195 S |
| 4,082,671 | 4/1978 | Kelly | 210/221 P |

*Primary Examiner*—Benoit Castel
*Attorney, Agent, or Firm*—Hal J. Bohner; Robert E. Krebs

[57] ABSTRACT

The following disclosure teaches means for thickening primary and secondary sewage sludge. The disclosed apparatus comprises a tank having upper and lower feedwells disposed therein. Primary sludge is introduced into the lower feedwell and flows into the lower part of the tank to thicken therein. Secondary sludge is aerated and introduced into the upper feedwell so that it flows therefrom and thickens in the upper part of the tank by flotation type thickening.

10 Claims, 3 Drawing Figures

4,173,534

SLUDGE THICKENING APPARATUS AND PROCESS

BACKGROUND OF THE INVENTION

Related Application

This application is a continuation in part of co-pending U.S. Pat. Application Ser. No. 728,480 filed Sept. 30, 1976, now U.S. Pat. No. 4,082,671.

Field of the Invention

This invention relates to means to purify municipal or industrial wastewater.

State of the Art

In a conventional wastewater treatment system of the activated sludge type, particle-bearing wastewater is passed through a primary clarifier wherein solid particles settle gravitationally while clarified wastewater is removed from the upper part of the clarifier. The clarified wastewater is thereafter passed into a biological treatment unit wherein air or oxygen is added to encourage growth and reproduction of micro-organisms in the wastewater. The effluent from the biological treatment unit is then passed into a so-called secondary clarifier wherein the micro-organisms settle to the bottom while clarified wastewater is removed and discharged to a receiving water such as a river. Concomitantly, the settled micro-organisms in the secondary clarifier are removed and portions thereof are returned to the biological treatment unit to provide therein a living culture of micro-organisms called activated sludge. The remainder of the micro-organisms settled in the secondary clarifier (called secondary sludge) and the solid particles settled in the primary clarifier (called primary sludge) are together discharged from the system for disposal. The primary and secondary sludges usually contain about 97% water or more; usually it is desirable to remove much of that water to increase the concentration of solids and to reduce the cost of subsequent disposal of the sludge. Devices which remove water from sludge are called thickeners and may be of various kinds, including gravity and flotation type.

In a typical gravity type thickener, sludge is allowed to settle in a tank so that sludge particles become more concentrated near the bottom of the tank while clarified liquid rises to the surface as it is displaced by the settling particles. Thickened sludge is then removed from the bottom of the tank.

In a typical flotation type thickener, feed sludge is first aerated at super atmospheric pressure and then is introduced into the flotation tank, which is at atmosphereic pressure, so that the air within the sludge forms into bubbles which carry sludge particles to the liquid surface in the tank. The thickened sludge at the tank surface is then removed while clarified liquid is removed from the lower part of the tank.

It is generally agreed that flotation type thickeners are superior to other types for thickening secondary sludge and, on the other hand, that gravity type thickeners are superior for thickening primary sludge. It is also known that primary sludge in a gravity type thickener often is decomposed by micro-organisms which do not require oxygen to sustain their metabolic processes. Such anaerobic decomposition is normally considered undesirable because it results in the production of gases which have unpleasant odors and which inhibit effective thickening. It has been suggested into reduce anaerobic decomposition during sludge thickening by covering the sludge with a blanket of liquid containing air. Such a process is taught, for example, in U.S. Pat. No. 3,140,259.

OBJECTS OF THE INVENTION

An object of the present invention is to provide means for concomitantly thickening primary and secondary sludge. Another object is to provide improved means for inhibiting anaerobic decomposition of primary sludge while the same is being thickened.

BRIEF DESCRIPTION OF THE DRAWINGS

Further objects and advantages of the present invention may be readily ascertained from the following description and appended illustrations which are offered by way of illustration only and not in limitation of the invention, the scope of which is defined by the appended claims and equivalents. In the drawings:

DETAILED DESCRIPTION OF THE INVENTION

Figure 1:
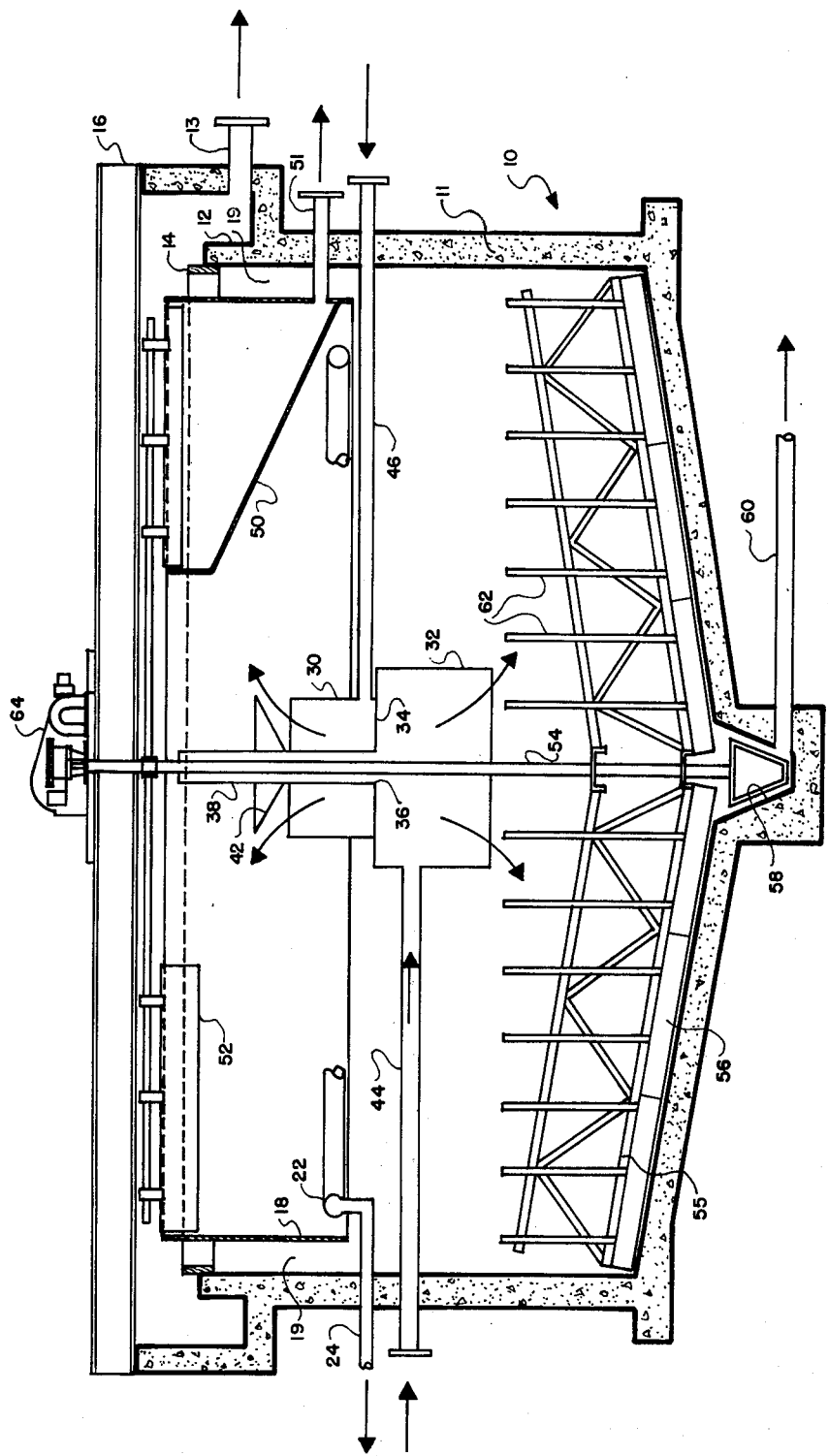
FIG. 1 is a sectional elevation of the preferred embodiment of apparatus according to the present invention, portions of which are illustrated schematically.

The apparatus illustrated in FIG. 1 generally includes an open-topped tank 10, preferably of cylindrical configuration with an upstanding sidewall 11, which receives primary and secondary sludge for treatment. A launder 12 is formed around the periphery of the sidewall of the tank 10, and mounted peripherally about the launder 12 is an adjustable wier wall 14 which defines the liquid level in the tank. A conduit 13 is connected in communication with the interior of the launder 12 to convey effluent liquid therefrom to disposal. In the illustrated embodiment, a horizontal beam 16 is stationarily mounted to extend across the top of the tank 10 to provide support for various components which are located within the tank; other support means could, of course, be provided.

According to the present invention, an upper feedwell 30 and a lower feedwell 32 are stationarily mounted generally concentric within the tank 10, one above the other. Both feedwells should be understood to be rigidly supported from the wall of the tank 10 although the actual support means have been omitted from the illustrations for purposes of clarity. Generally speaking, the upper feedwell 30 is a means for directing a stream of aerated secondary sludge upward into the tank 10 and the lower feedwell 32 is a means for directing a stream of primary sludge downward into the tank 10 as indicated by the curved arrows emanating from the respective feedwells. Usually, the two feedwells are positioned such that the lower feedwell 32 is located about midway between the bottom and top of the tank 10, but the exact vertical disposition of the feedwells can vary depending, among other things, upon the characteristics of the sludges being treated and their rates of flow.

In the illustrated embodiment, the lower feedwell 32 is a tubular member of cylindrical configuration which is open at the bottom and covered at the top by a closure means such as plate 34. A gas pipe 38 is connected to communicate via an aperture 36 formed centrally through the plate 34, between the interior of the lower feedwell 32 and the atmosphere above the liquid surface. Also, a feed pipe 44 is connected in communication with lower feedwell 32 to convey primary sludge thereinto.

The upper feedwell 30, shown in FIG. 1, is also a cylindrical tubular member, but it is open at the top and closed at the bottom. Preferably, the aforementioned plate 34 comprises both the bottom wall of the upper feedwell 30 and the top wall of the lower feedwell 32. A feed pipe 46 is connected in communication with the upper feedwell 30 to carry aerated secondary sludge thereinto. Preferably, an inverted conical baffle 42 is fixedly mounted about the gas pipe 38 above the upper feedwell 30 to direct the flow of aerated secondary sludge radially outward from the upper feedwell.

As also shown in FIG. 1, a continuous partition wall 18 of upright cylindrical configuration is stationarily mounted in the upper part of the tank 10 generally concentric and radially outward of the upper feedwell 30 so that an annular space 19 is defined between the partition wall 18 and the sidewall of the tank 10. The upper edge of the partition wall 18 extends above the liquid level in the tank 10 and the lower edge of that wall extends sufficiently deep into the tank so that aerated secondary sludge discharged from the upper feedwell 30 flows into the zone encompassed by the partition wall 18. The purpose of the partition wall 18 is to contain or encompass aerated secondary sludge within a defined zone in the upper part of the tank 10. As will be discussed below, separation of solids from liquid in the secondary sludge is accomplished in this zone whereby solids float upward from the secondary sludge while liquid from the sludge flows downward beneath the lower edge of the partition wall 18 into the annular space 19 for subsequent discharge.

The apparatus of FIG. 1 further includes a conventional float collection box 50 which is stationarily mounted within the zone encompassed by the partition wall 18 to collect solids floating on the liquid surface in that zone. A conduit 51 is connected in communication with the float box 50 to convey the collected solids to disposal outside the tank 10. To urge floating solids into the float box 50, there is provided a conventional rotary skimmer mechanism inclusive of pitotal skimmer paddles 52. In the illustrated embodiment, the skimmer mechanism is mounted to rotate on a vertical drive shaft 54 which is coupled at its upper end to a drive means 64 mounted on the support beam 16. The drive mechanism moves the skimmer paddles 52 across the surface of the liquid within the area defined by the partition wall 18, and floating solids are pushed by the paddles into the float collection box 50.

Referring still to FIG. 1, radially-extending rake arms 55 are coupled to the lower end of the vertical drive shaft 54 to be driven to rotate across the bottom of the tank 10 under the motive force of the drive unit 64. Fixed to the rake arms 55 are raking blades 56 positioned to push thickened primary sludge to a sludge pocket or sump 58 formed in the center of the bottom of the tank 10. A conduit 60 is connected in communication with the sludge pocket 58 to convey the settled (i.e. thickened) primary sludge to disposal. Also fixed to the rake arms for rotation therewith are vertical members 62, known in the art as pickets, which extend upward at spaced apart intervals. During rotation with the rake arms, the pickets gently agitate the liquid in the lower zone of the tank (i.e. the zone below the lower edge of the partition wall 18) and thereby enhance thickening and flocculation of the primary sludge in that zone.

The apparatus in FIG. 1 further includes a perforated pipe 22 which is mounted within the portion of the tank defined by the partition wall 18 and a conduit 24 which is connected to the partition pipe 22 and extends sealingly through the tank sidewall. The perforated pipe 22 encircles the upper feedwell 30 in a horizontal plane and lies closely adjacent the lower edge of the partition wall 18. The purpose of the perforated pipe, as will be explained in more detail later, is to serve as an auxiliary means for collecting wastewater from which solids have separated by flotation.

The operation of the aforedescribed device in combination with a wastewater treatment system of the activated sludge type can now be readily understood. With regard to the lower zone of the tank 10, primary sludge is continuously pumped into the lower feedwell 32 via pipe 44 and flows radially outward and downward therefrom into the tank. In the lower zone of the tank, solids from the primary sludge agglomerate and settle under the influence of gravity enhanced by the stirring motion of the pickets 62. The settled fraction of the primary sludge is raked by the blades 56 across the tank floor into the sump 58 and then is carried to disposal via conduit 60. Concomitantly, liquid separates from the primary sludge and flows upward into the annular space 19 between the partition wall 18 and the tank sidewall. Then this supernatant liquid flows over the weir wall 14 into the trough 12 and is carried to discharge via the conduit 13. When the perforated pipe 22 is utilized, it collects some of the supernatant liquid from the primary sludge and that liquid is then carried to discharge outside the tank via the conduit 24. When conditions in the lower part of the tank are anoxic, as such conditions normally will be, gases generated by the anaerobic decomposition of the primary sludge enter the pipe 38 and then escape upward to the atmosphere.

In the upper zone of the tank 10, aerated secondary sludge is continously pumped into the upper feedwell 30 via the conduit 46. The term "aerated secondary sludge" here means sludge which has been removed from the secondary clarifier of an activated sludge system and treated so that it contains air in dissolved or dispersed form. Systems to form aerated secondary sludge will be described hereinafter. Upon entry into the upper feedwell 30, the aerated secondary sludge flows upward and radially outward into the tank. Upon entry into the tank the aerated secondary sludge is exposed to atmospheric pressure and, as a result, bubbles of air form in the sludge and serve to cause solid particles from the sludge to float to the surface of the liquid in the tank. The floated solids are then urged into the float box 50 by the skimmer paddles 52 and are carried to disposal via the conduit 51. Liquid from which the solids have been floated flows downward below the partition wall 18 and then upward into the annular space 19. From there, that liquid flows over the weir 14 into the launder 12 and is continuously drawn off to discharge via the conduit 13. When utilized, the perforated pipe 22 also serves to collect a portion of the downwardly flowing liquid from the thickening secondary sludge.

It should be appreciated that there is synergistic effect when both primary sludge and aerated secondary sludge are processed in superimposed zones in the same tank as described above. To wit, the aerated secondary sludge in the upper zone of the tank contains substantially more oxygen than does the primary sludge, and, accordingly, it forms a blanket of oxygen-rich liquid above the body of primary sludge in the lower zone of tank 10. This oxygen-rich blanket diminishes the tendency of the primary sludge to become anaerobic and, further, promotes the aerobic decomposition of any solid particles which happen to rise into the blanket from the underlying body of primary sludge.

One advantage of utilizing the perforated pipe 22 as an auxiliary liquid removal means can now be appreciated. That is, the liquid collected by the perforated pipe can be readily admixed with the aerated secondary sludge into the upper feedwall 30 in order to dilute that sludge to a desired concentration, which dilution has been found to enhance the flotation of solids from aerated secondary sludge.

Figure 2:
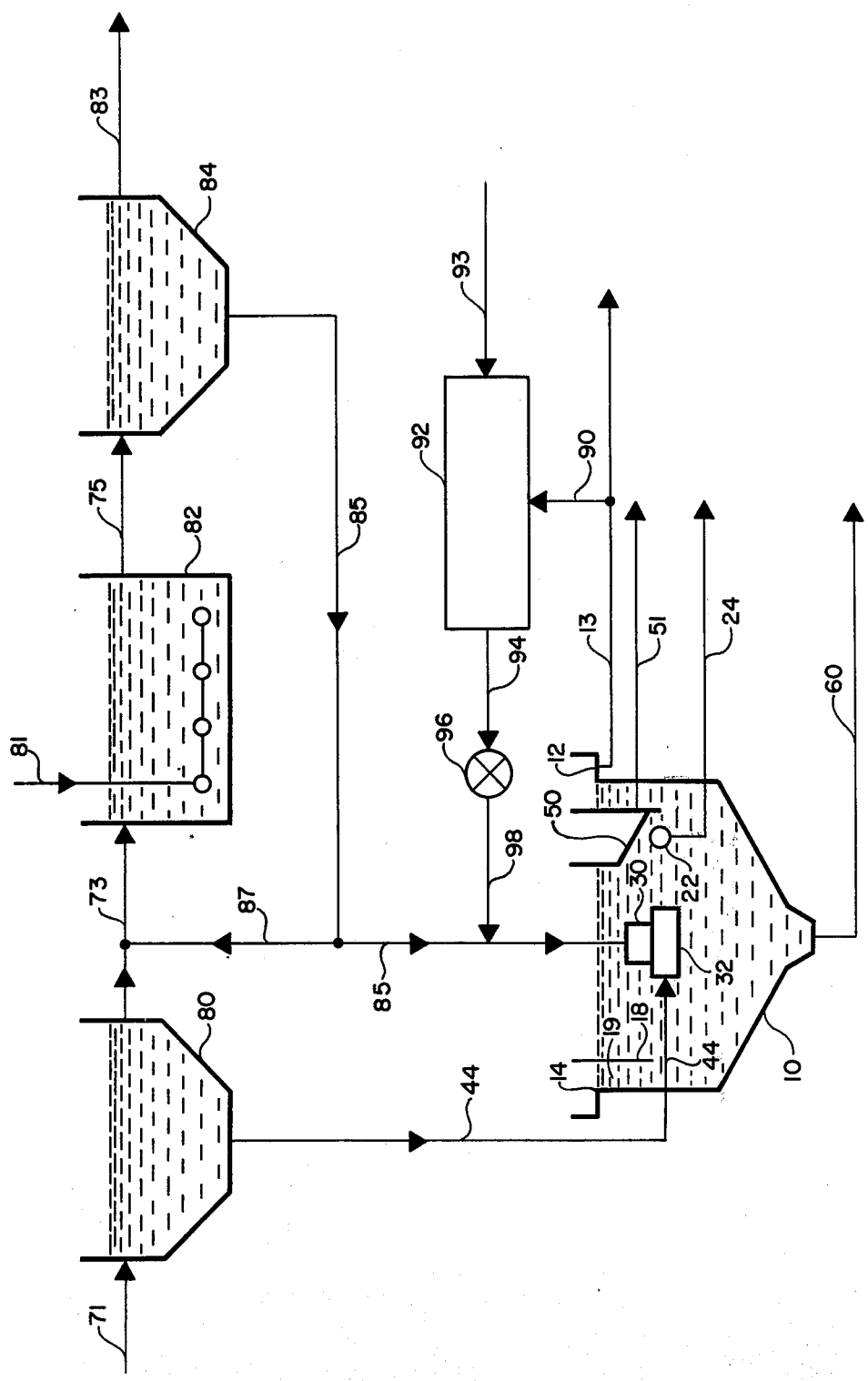
FIG. 2 is a schematic diagram of a system according to the present invention.

In FIG. 2, the aforedescribed apparatus is shown as one unit in a system to biologically treat sewage and thicken the sludges produced by such treatment. In the system, primary or raw sewage is conveyed into a conventional primary clarifier tank 80 via line 71. In the primary clarifier, primary sludge is settled from raw sewage. The sludge is then conveyed, via conduit 44, to the lower feedwell 32 of the tank 10 for treatment therein.

As further shown in the system of FIG. 2, supernatant wastewater from the primary clarifier 80 is carried, via conduit 73, into a biological treatment unit 82. Biological treatment units are well known and available in various configurations; the illustrated one should be understood to include a liquid-holding tank and means for introducing air or oxygen gas into the wastewater, say by means of a perforated-pipe diffuser disposed at the botom of the tank. In the biological treatment unit 82, micro-organisms act upon the wastewater to convert some of the pollutants therein into additional micro-organisms and various by-products. The effluent from the biological treatment unit is usually called secondary sewage and will be so referred to hereinafter.

From the biological treatment unit 82, the secondary sewage is conveyed, via conduit 75, into secondary clarifier 84 which serves the purpose of settling the micro-organisms from the wastewater to form the aforementioned secondary sludge. The secondary clarifier 84 can be understood to be substantially the same as the primary clarifier 80. From the secondary clarifier supernatant liquid is discharged, via line 83, to a receiving water such as a river. Secondary sludge is discharged from the secondary clarifier 84 through conduit 85. A first predetermined portion of that secondary sludge is returned, via line 87, to the biological treatment unit 82 to provide a culture of micro-organisms therein to act upon the primary sewage. The remainder of the secondary sludge is carried by line 85 to a junction with line 98 where it is mixed with aerated effluent liquid as will be described hereinafter. The mixture is thereafter introduced into the upper feedwell 30.

Effluent liquid leaves the tank 10 via line 13, and part of the liquid is transferred to a receiving water and part to a pressurized aeration unit 92 via line 90.

In the pressurized aeration unit 92 the effluent liquid is saturated with dissolved air, say by spraying the liquid against a baffle so that air, introduced under pressure into the unit via line 93, is absorbed into the liquid in dissolved, micronized or emulsified form. The aerated liquid is conveyed under pressure via conduit 94 to valve 96, which is located near the upper feedwall 30. The valve permits reduction of the pressure on the liquid so that as the liquid passes through conduit 98 to be mixed with secondary sludge in line 85, bubbles of air begin to form. The mixture of secondary sludge and aerated effluent liquid is transferred into upper feedwall 30.

Aerated secondary sludge enters tank 10 through upper feedwell 30, and bubbles of air in the sludge cause it to rise and thicken. The thickened secondary sludge is forced by skimmer paddles 52 into float box 50, and conduit 51 conveys the thickened sludge therefrom to disposal. Liquid which separates from thickening secondary sludge flows downward below the lower edge of partition wall 18 and then upward through the annular space 19, over weir 14, into launder 12 and thereafter from the tank 10 via conduit 13. Primary sludge enters tank 10 through lower feedwell 32 and settles and thickens in tank 10 and is thereafter discharged to disposal via conduit 60. Liquid which separates from the thickening sludge flows upward into the annular space 19, over weir 14, into launder 12 and thereafter from tank 10 via conduit 13.

Figure 3:
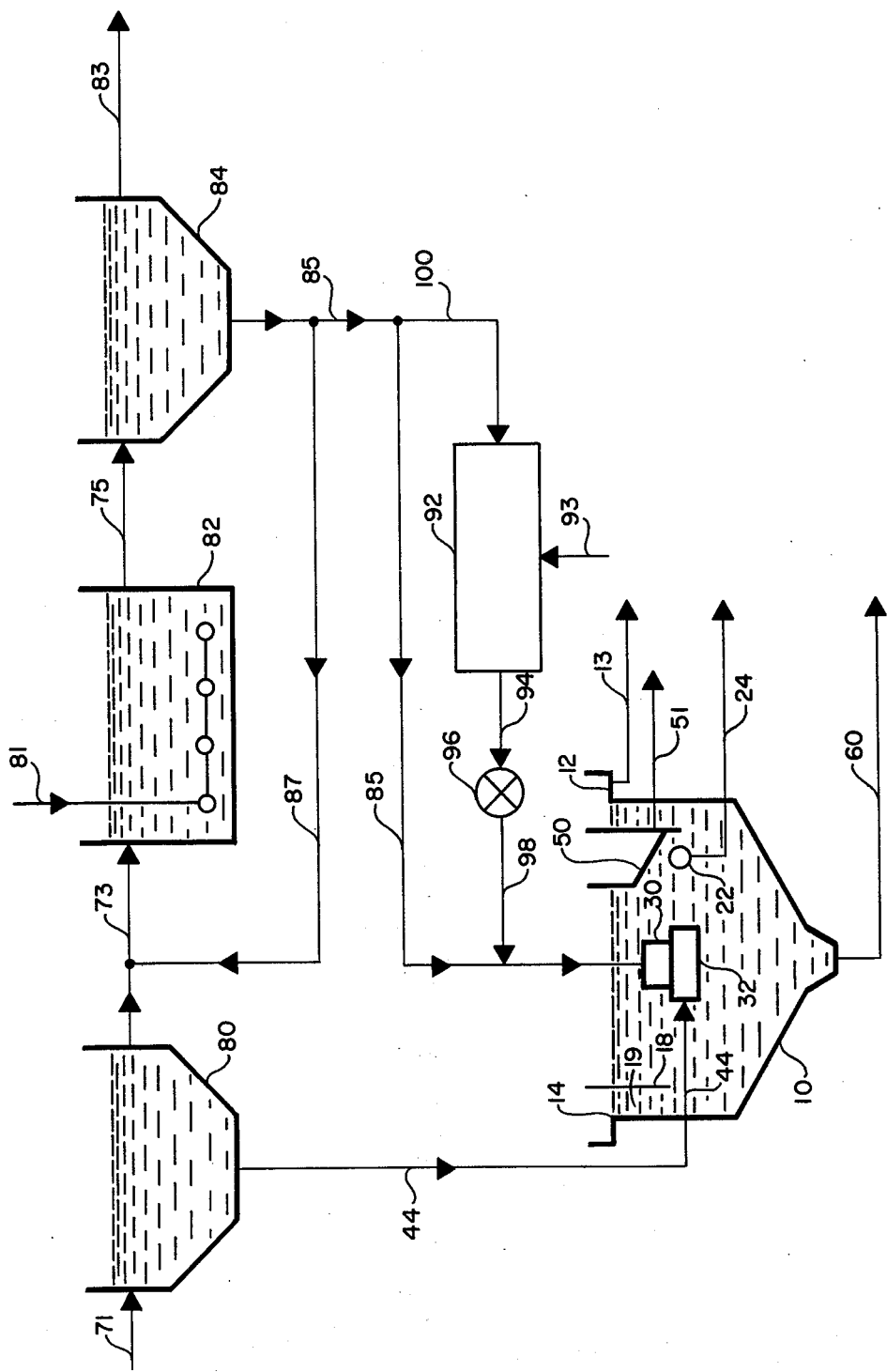
FIG. 3 is a schematic diagram of a second system according to the present invention.

The system shown in FIG. 3 is similar to that shown in FIG. 2, and corresponding parts are numbered the same. In the system shown in FIG. 3, part of the secondary sludge is conveyed via line 100 from line 85 to the pressurized aeration unit 92. The secondary sludge is aerated, and then transferred via line 98 to be mixed with the unaerated secondary sludge in line 85. The mixture of sludges is thereafter introduced into the upper feedwell 30.

It should be understood that in some applications neither effluent liquid nor secondary sludge is transferred to the pressurized aeration unit 92. But rather a fraction of the supernatant liquid leaving the final clarifier 84, via line 83 is transferred to the pressurized aeration unit 92. The resulting aerated supernatant liquid is thereafter mixed with secondary sludge in line 85, and the mixture is transferred to the upper feedwell 30. It should be further understood that water from an outside source, such as tap water can also be used in place of the supernatant liquid in some applications.

I claim:

1. In a wastewater treatment system of the activated sludge type including a primary clarifier, a biological treatment unit and a secondary clarifier, the improvement comprising:
   a. a treatment unit for concomitantly treating primary sludge and aerated secondary sludge, said treatment unit including an open tank and a continuous partition wall mounted to define a confined liquid zone in the upper part of said tank;
   b. means connected in communication between the primary clarifier and said tank for introducing primary sludge into the lower part of said tank, said means including first feedwell means;
   c. float collection means mounted within said confined liquid zone in said tank for collecting solids floating on the surface of the liquid within said confined zone;
   d. sediment collection means connected in communication with the bottom of said tank for collecting and discharging sediment therefrom;
   e. discharge means mounted in said tank outside said confined liquid zone for drawing effluent liquid from the surface of the body of liquid held in said tank outside said confined liquid zone;

f. pressurized aeration means connected in liquid-flow communication with said discharge means to aerate a portion of the effluent liquid at super atmospheric pressure;

g. means to introduce the aerated effluent liquid into a stream of secondary sludge to produce aerated secondary sludge; and h. means coupled in flow communication with the secondary clarifier to convey the aerated secondary sludge into the upper part of said tank above said first feedwell means, said means including a second feedwell means.

2. A system according to claim 1 further including a raking mechanism mounted for rotation in said tank to urge sediment therein toward said sediment collection means.

3. A system according to claim 2 further including picket members mounted to said raking mechanism for rotation therewith to agitate a primary sludge which has been introduced into said tank.

4. A system according to claim 1 wherein said float collection means comprises a float collection box and a skimmer mechanism mounted for rotation in said tank to urge solids floating on the surface of the liquid body in said tank into said float collection box.

5. A system according to claim 4 further including drive unit means mounted above said tank and coupled to rotably drive said raking mechanism and said skimmer mechanism.

6. A system according to claim 1 further including perforated conduit means mounted within said confined liquid zone in said tank adjacent the lower edge of said upstanding partition wall to collect liquid from said confined liquid zone.

7. In a wastewater treatment system of the activated sludge type including a primary clarifier, a biological treatment unit and a secondary clarifier, the improvement comprising:

a. a treatment unit for concomitantly treating primary sludge and aerated secondary sludge, said treatment unit including an open tank, an upper feedwell for introducing aerated secondary sludge into said tank, a lower feedwell for introducing primary sludge below said upper feedwell in said tank, and a continuous partition wall mounted to define a confined liquid zone in the upper part of said tank;

b. means connected in communication between the primary clarifier and said tank for introducing primary sludge into said tank below the aerated secondary sludge;

c. float collection means mounted within said confined liquid zone in said tank for collecting solids floating on the surface of the liquid within said confined zone;

d. sediment collection means connected in communication with the bottom of said tank for collecting and discharging sediment therefrom;

e. discharge means mounted in said tank outside said confined liquid zone for drawing liquid from the surface of the body of liquid held in said tank outside said confined liquid zone;

f. pressurized aeration means in flow communication with said upper feedwell to aerate liquid at superatmospheric pressure to form a stream of aerated liquid;

g. means to convey a stream of secondary sludge from said secondary clarifier to mix with the stream of aerated liquid to form a stream of aerated secondary sludge; and h. means to convey the aerated secondary sludge into said upper feedwell.

8. A system according to claim 7 further including and inverted conical baffle mounted above said upper feedwell to distribute flow therefrom radially outward into said tank.

9. A system according to claim 7 further including a conduit connected in gas-flow communication between the interior of said lower feedwell and the atmosphere above the surface of said body contained in said tank.

10. The system of claim 7 further including means to convey a second stream of secondary sludge from said secondary clarifier to said pressurized aeration means for aeration therein.

* * * * *